United States Patent
Stapelfeld et al.

(10) Patent No.: US 8,006,649 B2
(45) Date of Patent: Aug. 30, 2011

(54) ANIMAL CONTROL SYSTEM HAVING CORRECTION MONITOR

(75) Inventors: Norval Stapelfeld, Manchester, NH (US); Frederic T. Peterson, Chelmsford, MA (US)

(73) Assignee: Dogwatch Inc., Natick, MA (US)

(*) Notice: Subject to any disclaimer, the term of this patent is extended or adjusted under 35 U.S.C. 154(b) by 466 days.

(21) Appl. No.: 11/901,075

(22) Filed: Sep. 14, 2007

(65) Prior Publication Data
US 2009/0071413 A1 Mar. 19, 2009

(51) Int. Cl.
*A01K 15/04* (2006.01)
(52) U.S. Cl. .................................. 119/721
(58) Field of Classification Search .............. 119/712, 119/720, 721
See application file for complete search history.

(56) References Cited

U.S. PATENT DOCUMENTS

| | | | |
|---|---|---|---|
| 3,589,337 A | 6/1971 | Doss | |
| 3,753,421 A | 8/1973 | Peck | |
| 3,777,712 A | 12/1973 | Gardner et al. | |
| 3,980,051 A | 9/1976 | Fury | |
| 4,136,338 A | 1/1979 | Antenore | |
| 4,202,293 A | 5/1980 | Gonda et al. | |
| 4,335,682 A | 6/1982 | Gonda et al. | |
| 4,733,633 A | 3/1988 | Yarnall, Sr. et al. | |
| 4,745,882 A | 5/1988 | Yarnall, Sr. et al. | |
| 4,766,847 A | 8/1988 | Venczel et al. | |
| 4,802,482 A | 2/1989 | Gonda et al. | |
| 4,887,549 A | 12/1989 | Powell | |
| 4,898,120 A | 2/1990 | Brose | |
| 5,046,453 A | 9/1991 | Vinci | |
| 5,054,428 A | 10/1991 | Farkus | |
| 5,068,642 A | 11/1991 | Hruby et al. | |
| 5,121,711 A | 6/1992 | Aine | |
| 5,161,485 A | 11/1992 | McDade | |
| 5,170,149 A | 12/1992 | Yarnall, Sr. et al. | |
| 5,241,923 A | 9/1993 | Janning | |
| 5,349,926 A | 9/1994 | McCarney et al. | |
| 5,353,744 A | 10/1994 | Custer | |
| 5,425,330 A | 6/1995 | Touchton et al. | |
| 5,465,687 A | 11/1995 | Custer | |

(Continued)

FOREIGN PATENT DOCUMENTS
FR 2455843 11/1980
(Continued)

*Primary Examiner* — Rob Swiatek
*Assistant Examiner* — Kristen Hayes
(74) *Attorney, Agent, or Firm* — Weingarten, Schurgin, Gagnebin & Lebovici LLP

(57) ABSTRACT

A receiver for an animal control system having a correction monitor which indicates that the animal has attempted to challenge the system, as determined by the occurrence of one or more correction events within a specified period of time. A correction event occurs when a stimulus is applied to the animal. The stimulus may be an audible alert, or may be an electrical shock. The correction monitor is operative to monitor correction events and to provide an indication that an event has occurred. In one embodiment, the correction event can be signaled to a user at the receiver by use of an LED or other indicator or display which is latched on for a defined period of time. In another embodiment, the correction event can be signaled to a user at a central location, such as by an indicator or display in the animal owner's house. The correction event may also be signaled remotely via a communications path or network, and displayed in any suitable manner at one or more remote locations. The time of correction events and location information can be provided in association with the event indication.

12 Claims, 2 Drawing Sheets

U.S. PATENT DOCUMENTS

| | | | |
|---|---|---|---|
| 5,533,469 | A | 7/1996 | Touchton et al. |
| 5,608,381 | A | 3/1997 | McCarney et al. |
| 5,610,588 | A | 3/1997 | Yarnall, Sr. et al. |
| 5,640,932 | A | 6/1997 | Bianco et al. |
| 5,642,690 | A | 7/1997 | Calabrese et al. |
| 5,650,770 | A | 7/1997 | Schlager et al. |
| 5,769,032 | A | 6/1998 | Yarnall, Sr. et al. |
| 5,787,841 | A | 8/1998 | Titus et al. |
| 5,791,294 | A | 8/1998 | Manning |
| 5,794,569 | A | 8/1998 | Titus et al. |
| 5,815,077 | A | 9/1998 | Christiansen |
| 5,844,489 | A | 12/1998 | Yarnall, Sr. et al. |
| 6,019,066 | A | 2/2000 | Taylor |
| 6,043,748 | A | 3/2000 | Touchton et al. |
| 6,058,889 | A * | 5/2000 | Van Curen et al. ........... 119/721 |
| 6,079,367 | A | 6/2000 | Stapelfeld et al. |
| 6,095,092 | A | 8/2000 | Chou |
| 6,131,535 | A | 10/2000 | So |
| 6,135,060 | A | 10/2000 | So |
| 6,155,208 | A | 12/2000 | Schell et al. |
| 6,170,439 | B1 | 1/2001 | Duncan et al. |
| 6,360,698 | B1 | 3/2002 | Stapelfeld et al. |
| 6,367,435 | B1 | 4/2002 | Okui et al. |
| 6,467,435 | B2 | 10/2002 | Stapelfeld et al. |
| 6,474,269 | B2 | 11/2002 | So |
| 6,561,137 | B2 | 5/2003 | Oakman |
| 6,575,120 | B1 | 6/2003 | Stapelfeld et al. |
| 6,598,563 | B2 | 7/2003 | Kim et al. |
| 6,600,422 | B2 | 7/2003 | Barry et al. |
| 6,712,025 | B2 | 3/2004 | Petersen et al. |
| 6,825,768 | B2 * | 11/2004 | Stapelfeld et al. ......... 340/573.3 |
| 6,923,146 | B2 * | 8/2005 | Kobitz et al. ................. 119/721 |
| 7,042,361 | B2 | 5/2006 | Kazdin et al. |
| 7,046,152 | B1 | 5/2006 | Peinetti et al. |
| 7,068,174 | B1 | 6/2006 | Peinetti et al. |
| 7,117,822 | B1 | 10/2006 | Peinetti et al. |
| 7,204,204 | B1 | 4/2007 | Peinetti et al. |
| 7,411,492 | B2 | 8/2008 | Greenberg |
| 7,421,979 | B2 * | 9/2008 | Kim .............................. 119/721 |
| 2002/0073933 | A1 | 6/2002 | Oakman |
| 2003/0116101 | A1 | 6/2003 | Kim et al. |
| 2005/0066912 | A1 * | 3/2005 | Korbitz et al. ................. 119/721 |
| 2005/0139169 | A1 * | 6/2005 | So ................................. 119/721 |
| 2006/0102101 | A1 | 5/2006 | Kim |
| 2007/0056526 | A1 | 3/2007 | Gianladis et al. |
| 2007/0095304 | A1 * | 5/2007 | Rosenberg et al. ........... 119/720 |
| 2007/0289554 | A1 | 12/2007 | Moore |
| 2008/0236514 | A1 | 10/2008 | Johnson et al. |

FOREIGN PATENT DOCUMENTS

| | | |
|---|---|---|
| WO | WO 94/02004 | 2/1994 |
| WO | WO 95/28691 | 10/1995 |

* cited by examiner

ANIMAL CONTROL SYSTEM HAVING CORRECTION MONITOR

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Animal control systems are known in which a transmitter generates a coded signal that is radiated by a wire loop antenna which is buried a few inches underground and which defines an area in which the animal, typically a dog, is to be contained or from which the animal is to be restricted. A receiver mounted on a collar placed around the neck of the animal includes one or more electrodes which are in physical contact with the skin of the animal. As the animal wearing the receiver approaches the wire loop antenna, the receiver detects the radiated signal, and if the received signal meets one or more qualifying standards, a stimulus is applied to the animal. The stimulus may be in the form of an audible alert and/or an electric shock administered to the animal through the electrodes. Examples of such systems are shown in U.S. Pat. Nos. 5,465,687, 5,353,744, 6,360,698 and 6,367,435, all assigned to the Assignee of the present invention and incorporated herein by reference.

BRIEF SUMMARY OF THE INVENTION

The present invention provides a receiver for an animal control system, such as the system described above, having a correction monitor which indicates for some extended period of time that the animal has attempted to challenge the system, as determined by the occurrence of one or more correction events within a specified period of time. A correction event occurs when a stimulus is applied to the animal. The stimulus may be an audible alert, or may be an electrical shock. The correction monitor is operative to monitor correction events and to provide an indication that an event has occurred. An owner of the animal will be notified by the indication that the animal attempted to challenge the system and received a correction. Such notification is evident even if the owner or other applicable person is not present when the animal received the correction, since the indication remains on for an extended period of time, typically 24 hours.

In one embodiment, the correction event can be signaled to an owner or other user at the receiver by use of an LED or other indicator or display which is latched on for a defined period of time. In another embodiment, the correction event can be signaled to a user at a central location, such as by an indicator or display in the animal owner's house. The correction event may also be signaled remotely and displayed in any suitable manner at one or more remote locations. The correction event can be signaled via any convenient wireless or wired communications path or network such as the Internet to provide an output indication that a correction event has occurred. In a further embodiment, the time of each correction event can be signified along with the event indication. By use of the invention, an animal owner or other interested persons can observe the behavior of the animal and the frequency with which the animal has challenged the system.

The animal control system having a correction monitor in accordance with the invention can be used for domestic pets, such as dogs, to monitor and control their behavior in a yard or other domestic setting. The invention can also be used with farm animals and other animals for monitoring their location and behavior such as in a ranch or coral or other area in which the animals are to be contained.

In an alternative embodiment, the receiver worn by the animal can have the capability to identify the geographic position of the animal by utilizing systems such as multi-signal triangulation coordinate systems or GPS systems, as well as providing a stimulus to the animal in the event that the animal attempts to enter a protected zone or attempts to leave a protected zone, and to provide an indication of such stimulus or correction event.

In a further alternative embodiment, multiple protected zones can be provided each having a distinguishable signal characteristic such that the zone challenged by the animal can be identified. This can be accomplished for example by coded transmitter signals provided by the respective antennas defining the perimeter of the respective zones. The signals from the receiver worn by an animal provide a signal indication of a correction event which can be decoded to denote the particular correction zone in which the event occurred.

BRIEF DESCRIPTION OF THE SEVERAL VIEWS OF THE DRAWINGS

The invention will be more fully described in the following detailed description taken in conjunction with the drawings, in which.

DETAILED DESCRIPTION OF THE INVENTION

Figure 1:
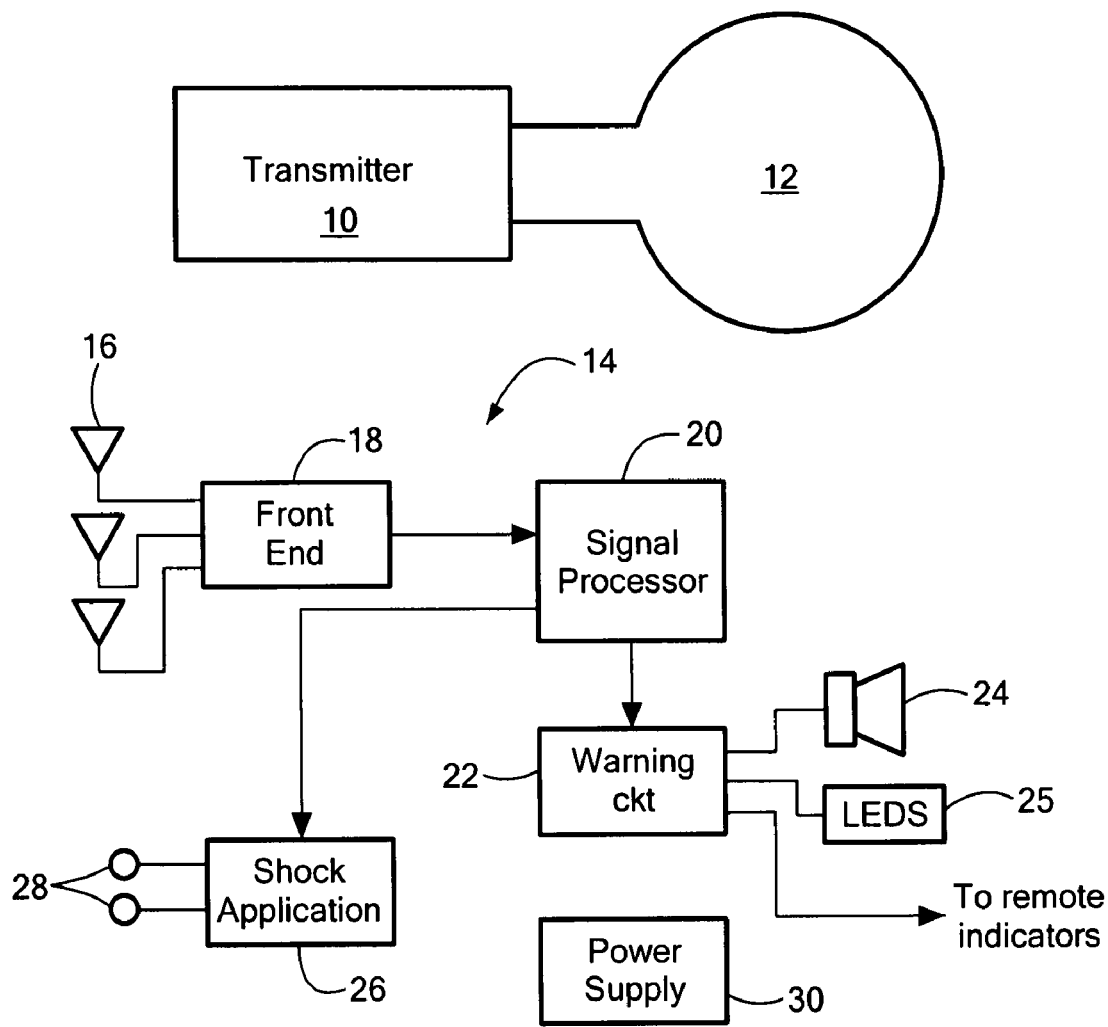
FIG. 1 is a block diagram of an animal control system having a correction monitor in accordance with the invention.

An animal control system in which the correction monitor in accordance with the invention is employed is shown in FIG. 1. A transmitter 10 is coupled to a loop antenna 12 which, for outdoor use, is buried around the perimeter of a yard or other site in which a dog or other animal is to be contained. Alternatively, the loop antenna can define a perimeter into which the animal is to be restrained from entry. A receiver 14 is enclosed within a small waterproof housing affixed to a collar worn by the animal. The receiver is operative to detect radiation from the antenna and, depending upon the proximity of the receiver from the antenna, will provide a warning signal or a stimulus signal to the animal. A protocol for conditioning the animal to the animal control system is disclosed in the above referenced U.S. Pat. Nos. 5,465,687 and 5,353,744. The typical animal learns very quickly to stay away from the perimeter and to either remain within, or stay outside of, the defined area. The receiver 14 in the illustrated embodiment comprises an antenna assembly having three antennas 16 arranged along mutually orthogonal axes, a front end circuit 18, a signal processor circuit 20, a warning circuit 22, a shock application circuit 16 coupled to electrodes 28, and a battery powered power supply 30. The warning circuit 22 is coupled to an audible annunciator 24 such as a loudspeaker, to one or more LEDs or other visible indicators 25, and can also provide an output signal for transmission to one or more remote indicators or displays.

Figure 2:
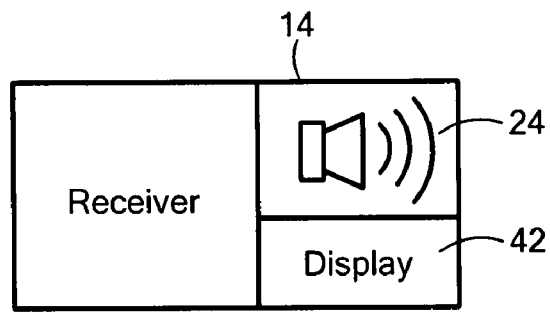
FIG. 2 is a diagrammatic representation of a receiver in accordance with the invention.

The receiver 14, shown diagrammatically in FIG. 2, includes an audible alarm 40 such as a loudspeaker or other audio annunciator, and a visual display 42, such as one or more indicator LEDs or other lights, and/or a numerical display. The one or more indicator LEDs or other lights which are present in the receiver for the purposes of monitoring system operation, can also be used for the correction monitoring of the present invention. Alternatively, the correction monitor can have its own separate indicators.

Figure 3:
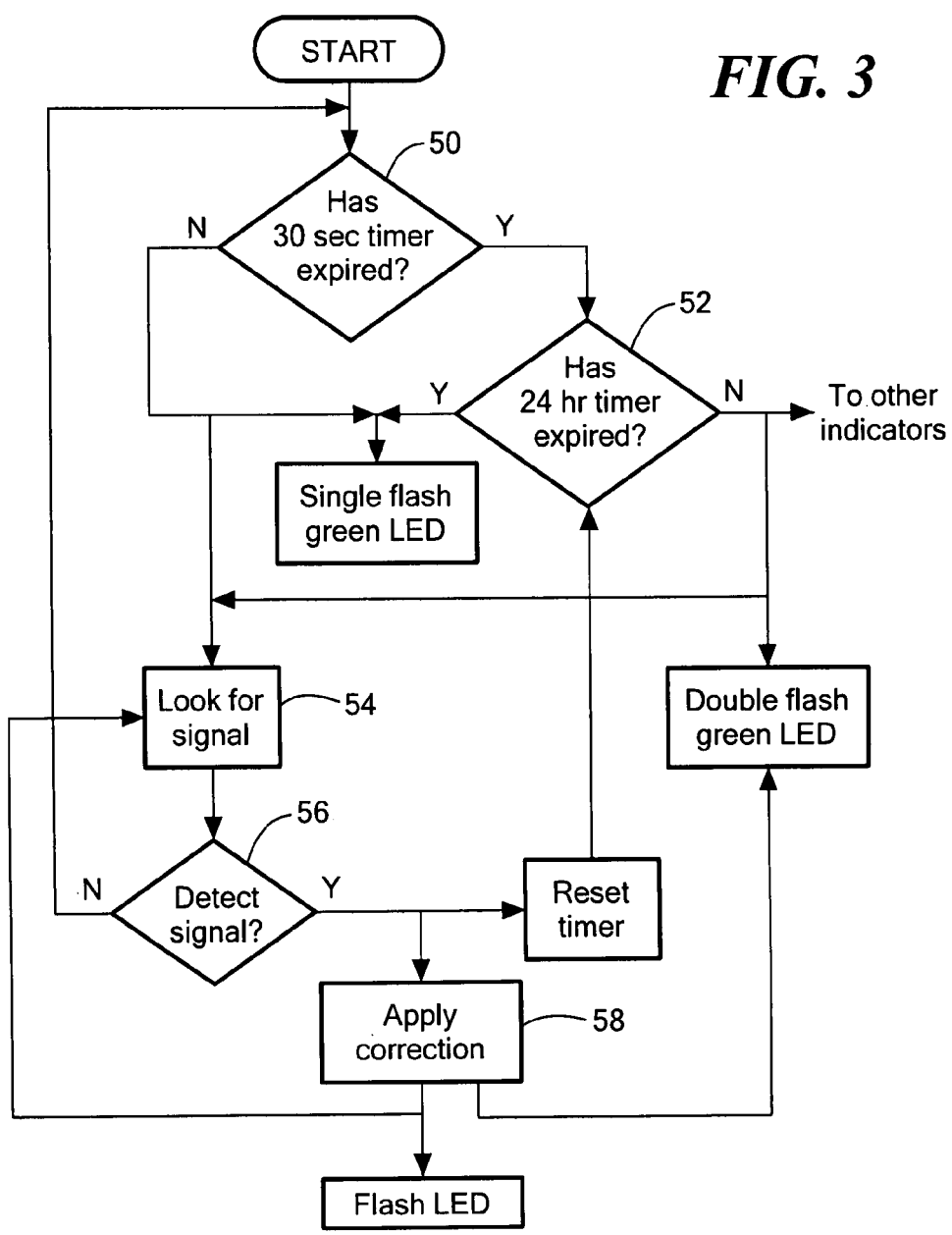
FIG. 3 is a flowchart illustrating operation of the correction monitor in accordance with the invention.

The correction monitor process is shown in the flowchart of FIG. 3. This process is implemented in the receiver primarily by the signal processor 20 which typically is a microprocessor-controlled signal processor. Referring to FIG. 3, a time period is established by a timer which counts down in predetermined intervals (block 50) which in the illustration are 30 second intervals. If the 30 second time period has expired, a determination is made whether a 24 hour timer period has expired (block 52). It will be appreciate that the 24 hour time period can be changed to any other desirable time period. If the 24 hour timer has expired, a signal is applied to the receiver LED indicator to provide a single green flash every 30 seconds to signify proper system operation. The 24 hour timer is reset every 24 hours, or other predetermined time period. The system looks for a signal from the transmitter (block 54) and if a signal is detected (block (56), a correction is caused to be applied to the animal (block 58) and upon such correction, the receiver LED is flashed to coincide with the audible correction, and another LED is flashed to coincide with the electrical correction. When the correction ceases, after a small amount of time which can be set, a receiver LED is double flashed to signify that a correction has occurred. The correction can be determined by the provision of an audible beep caused by the animal approaching the defined perimeter, or alternatively, the correction can be determined by the provision of a shock signal to the animal caused by the animal's further encroachment into the protected zone. Thus, the system can provide a correction monitor signal in response to a warning signal providing an audible alarm, or to the shock signal providing a shock stimulus to the animal. The double flashed green LED on the receiver will continue to double flash during the 24 hour timer period, and the double flash will be discontinued when the 24 hour timer is reset. Upon a correction event, the green receiver LED is caused to flash at a faster rate, typically one to two flashes per second, for so long as the receiver is receiving a signal from the transmitter. In other words, the receiver LED is flashed at a faster rate for so long as the animal is in a position to receive a correction.

The correction monitor can be employed in animal control systems for both outside and inside use.

For outside use, the protected area is defined by a buried wire antenna which defines the perimeter of an area in which the animal is to be contained or from which the animal is to be restrained from entry.

For indoor use, a wire antenna can be looped around an area to be protected. Typically, the wire is located under a rug or beneath a couch or other piece of furniture. A protected area can also be defined by the radiation pattern of an air core, a ferrite or other stick type antenna. For example, the antenna can be placed on a tabletop or countertop to provide a generally hemispherical radiation pattern and a volume into which the animal should not stray. The entry of the animal into the protected zone will cause the correction.

In another embodiment, a plurality of protected areas can be defined and distinctive correction signals can be provided in order to differentiate the area or zone in which the correction occurred. The correction monitor can receive the correction signals and provide an indication of the zone in which the correction occurred. The identification of the zone is denoted by the distinct correction signal provided upon entry or attempted entry into that zone by the animal.

The receiver can include or be associated with a coordinate detecting receiver to provide geographic position information in association with the correction indications. Such a receiver can be a GPS receiver or a receiver which utilizes multiple transmitted signals from a local or remote triangulation system.

The monitor signal can be transmitted to one or more remote locations so that the behavior of the animal can be signaled and/or displayed to the animal owner or other interested persons. The monitor information can be posted to an owner's web site or other applicable web site which can be accessed to display the number of corrections which have occurred during a defined period of time. The time when each correction occurred can also be provided.

Figure 4:
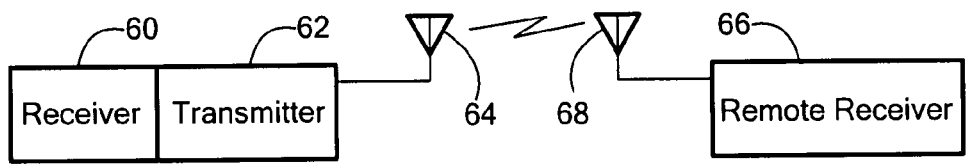
FIG. 4 is a diagrammatic representation of an embodiment of the invention providing remote signaling.

FIG. 4 shown in diagrammatic form a receiver 60 which includes a transmitter section 62 which comprises a wireless transmitter having an antenna 64 for transmitting wireless signals to a remote receiver having an antenna 68 for receipt of the wireless signals. The remote receiver can be coupled to one or more indicators or displays for denoting correction events and the time of those events. Coordinate information can also be displayed if the receiver 60 has GPS or other geographic monitoring capability, such as described above.

The monitor signals can be provided to a home automation or home monitoring system as one of the items of information provided to a user. As an example, if a user is away from home, the user can check on various conditions being monitored such as temperature inside the house, possible water in the basement, electrical failure, and other such conditions. Moreover, in accordance with the invention the behavior of the dog or other animal being monitored can be noted with respect to attempts by the animal to enter a protected zone or to leave a protected area. The monitoring of the home conditions can be by a suitable remote display accessible, for example, via the Internet or wirelessly transmitted to the user such as the user's cell phone or other personal digital assistant or other such device.

The invention is not to be limited by what has been particularly shown and described but is to encompass the full spirit and scope of the claims.

What is claimed is:

1. Apparatus for providing an indication to a user that a stimulus has been provided to an animal, comprising:
   a receiver adapted to be worn by an animal, said receiver including a timer operative to provide a defined time interval;
   a monitoring circuit in the receiver, said monitoring circuit operative to generate a monitor signal in response to the valid detection of a radiated field from an antenna defining a restricted area for the animal, said valid detection of the radiated field being associated with the proximity of the animal to the antenna, said monitoring circuit further operative in response to the monitor signal to restart the timer;
   a stimulus generator in the receiver operative in response to the monitor signal to provide a stimulus to the animal in the form of an electric shock or an audible signal; and
   a monitor indicator operative autonomously in response to the monitor signal to provide an indication for a user that the stimulus has been provided to the animal, said indication extending substantially for the defined time interval and extending substantially beyond the occurrence of the stimulus.

2. The apparatus of claim 1 wherein the monitor indicator is located on the receiver.

3. The apparatus of claim 1 wherein the monitor indicator is located at a central location.

4. The apparatus of claim 1 including apparatus for providing a representation of the monitor signal to a communications path for transmission along the path to a remote receiving site, the monitor indicator being disposed at the remote receiving site.

5. The apparatus of claim 4 wherein the communications path includes the Internet.

6. The apparatus of claim 1 wherein the monitor indicator includes at least one visual indicator located on the receiver.

7. The apparatus of claim 1 wherein the monitor indicator provides the indication and the time of the indication.

8. The apparatus of claim 1 wherein the monitor indicator includes an LED which is energized for the defined time interval.

9. The apparatus of claim 1 wherein the monitor indicator includes an LED which is double flashed for the defined time interval.

10. The apparatus of claim 9 wherein the defined time interval is 24 hours.

11. The apparatus of claim 1 wherein the monitor indicator provides the indication and the geographic position of the receiver worn by the animal.

12. The apparatus of claim 1 wherein the receiver is operative to provide an identification of one of a plurality of zones in which the stimulus was provided to the animal and the monitor indicator is operative to provide an identification of the one zone of the plurality of zones in which the stimulus was provided to the animal.

* * * * *